(12) United States Patent
Byun et al.

(10) Patent No.: US 11,924,701 B2
(45) Date of Patent: Mar. 5, 2024

(54) SUPPORT OF ENERGY EFFICIENT OPERATION

(71) Applicant: LG ELECTRONICS INC., Seoul (KR)

(72) Inventors: Daewook Byun, Seoul (KR); Hongsuk Kim, Seoul (KR); Jian Xu, Seoul (KR); Seokjung Kim, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 253 days.

(21) Appl. No.: 17/420,995

(22) PCT Filed: Mar. 9, 2020

(86) PCT No.: PCT/KR2020/003219
§ 371 (c)(1),
(2) Date: Jul. 6, 2021

(87) PCT Pub. No.: WO2020/184924
PCT Pub. Date: Sep. 17, 2020

(65) Prior Publication Data
US 2022/0086716 A1 Mar. 17, 2022

(30) Foreign Application Priority Data
Mar. 11, 2019 (KR) .......................... 10-2019-0027686

(51) Int. Cl.
*H04W 36/08* (2009.01)
*H04W 36/32* (2009.01)
*H04W 52/02* (2009.01)

(52) U.S. Cl.
CPC ........... *H04W 36/08* (2013.01); *H04W 36/32* (2013.01); *H04W 52/0261* (2013.01)

(58) Field of Classification Search
CPC . H04W 36/08; H04W 36/32; H04W 52/0261; H04W 36/24; H04W 52/0209; Y02D 30/70
(Continued)

(56) References Cited

U.S. PATENT DOCUMENTS

2009/0129335 A1 5/2009 Lee et al.
2009/0168725 A1* 7/2009 Mishra ................. H04W 36/32
370/331

(Continued)

FOREIGN PATENT DOCUMENTS

KR 1020050089692 9/2005
KR 100802154 2/2008

OTHER PUBLICATIONS

PCT International Application No. PCT/KR2020/003219, International Search Report dated Jun. 16, 2020, 4 pages.

*Primary Examiner* — Michael Y Mapa
(74) *Attorney, Agent, or Firm* — LEE, HONG, DEGERMAN, KANG & WAIMEY

(57) ABSTRACT

A method and apparatus for support of energy efficient operation of a wireless device, e.g., a user equipment (UE), in a 5$^{th}$ generation new radio access technology (5G NR) is provided. A source node acquires information related to power consumption of a wireless device and transmits a message for initiation of handover. The message includes information related to energy efficiency of the wireless device. The information related to energy efficiency is based on the information related to power consumption of the wireless device. The target node performs admission control and/or resource allocation for the wireless device based on the information related to energy efficiency of the wireless device.

9 Claims, 14 Drawing Sheets

(58) Field of Classification Search
USPC .......................... 370/331; 455/436–444, 574
See application file for complete search history.

(56) References Cited

U.S. PATENT DOCUMENTS

| | | |
|---|---|---|
| 2010/0232327 A1 | 9/2010 | Kim et al. |
| 2011/0207460 A1* | 8/2011 | Kim .................... H04W 36/08 |
| | | 455/436 |
| 2014/0018085 A1* | 1/2014 | Young .................. H04W 76/27 |
| | | 455/450 |
| 2015/0195800 A1 | 7/2015 | Zhu et al. |
| 2015/0289180 A1* | 10/2015 | Koskinen .......... H04W 36/0033 |
| | | 455/436 |
| 2019/0387401 A1* | 12/2019 | Liao .................. H04W 28/0289 |

\* cited by examiner

SUPPORT OF ENERGY EFFICIENT OPERATION

CROSS-REFERENCE TO RELATED APPLICATIONS

This application is the National Stage filing under 35 U.S.C. 371 of International Application No. PCT/KR2020/003219, filed on Mar. 9, 2020, which claims the benefit of earlier filing date and right of priority to Korean Patent Application No. 10-2019-0027686, filed on Mar. 11, 2019, the contents of which are all incorporated by reference herein in their entirety.

TECHNICAL FIELD

The present disclosure relates to support of energy efficient operation of a wireless device, e.g., a user equipment (UE), in a $5^{th}$ generation new radio access technology (5G NR).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

User equipment (UE) battery life is an important aspect of the user's experience, which will influence the adoption of 5G NR handsets and/or services. It is critical to study UE power consumption to ensure that UE power efficiency for 5G NR UEs can be better than that of LTE, and techniques and designs for improvements are identified and adopted.

SUMMARY

In 5G NR, study on radio access network (RAN)-centric data collection and utilization, and UE power saving framework taking into consideration of latency and performance are in progress. Such mechanism for UE energy efficient operation should consider a case that the UE moves between gNBs.

In an aspect, a method for a source node in a wireless communication system is provided. The method includes acquiring information related to power consumption of a wireless device, transmitting a message for initiation of handover. The message includes information related to energy efficiency of the wireless device. The information related to energy efficiency is based on the information related to power consumption of the wireless device.

In another aspect, a method for a target node in a wireless communication system is provided. The method includes acquiring information related to energy efficiency of a wireless device, and performing admission control and/or resource allocation for the wireless device based on the information related to energy efficiency of the wireless device.

The present disclosure can have various advantageous effects.

For example, the target gNB can know the energy efficiency information for UE which is to be handed over.

For example, based on the energy efficiency information for UE, the target gNB can assist energy efficient operation of the UE (e.g., resource allocation considering energy efficiency for the UE).

For example, UE's experience can be enhanced by maximizing UE battery lifetime.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Figure 1:
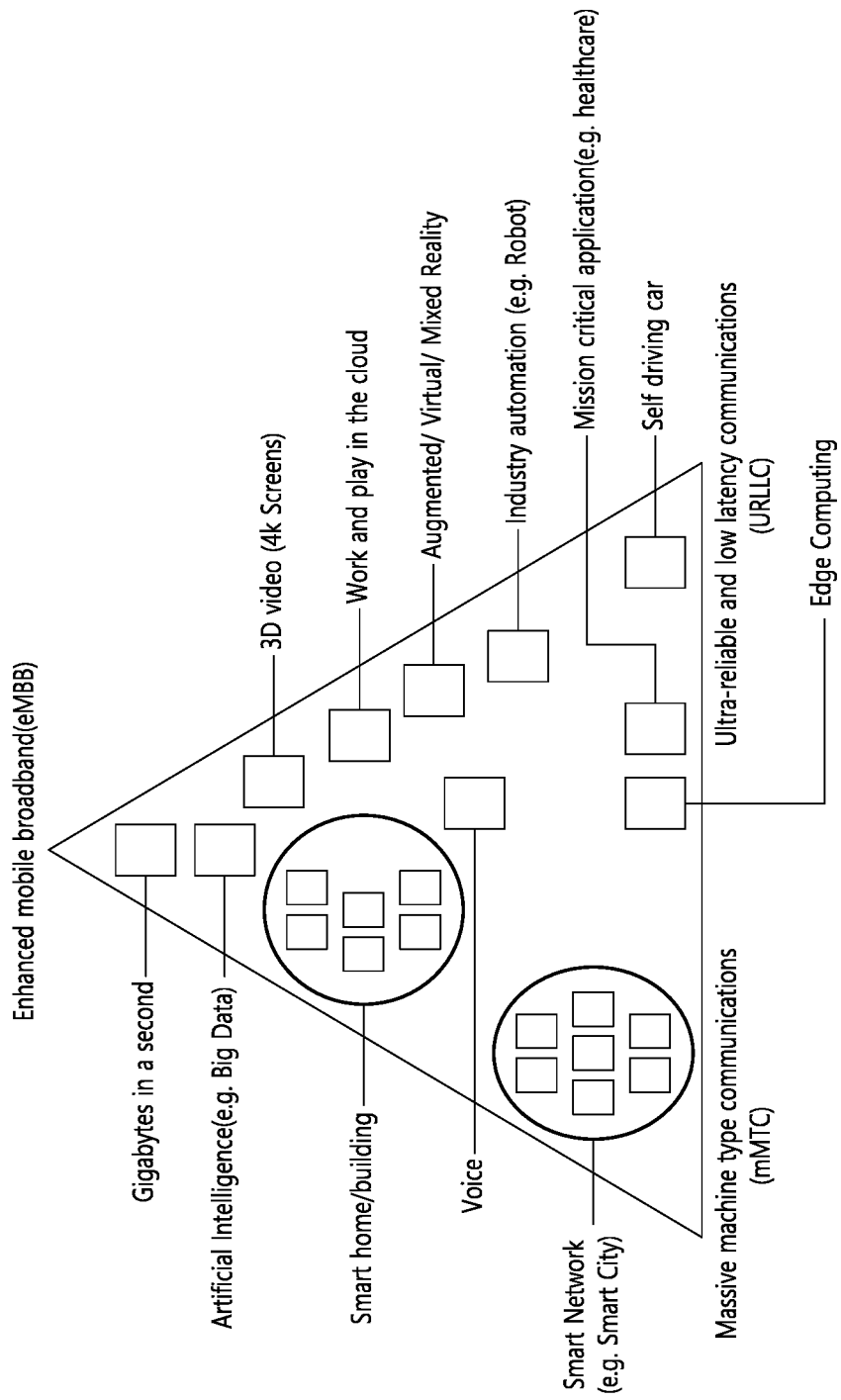
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
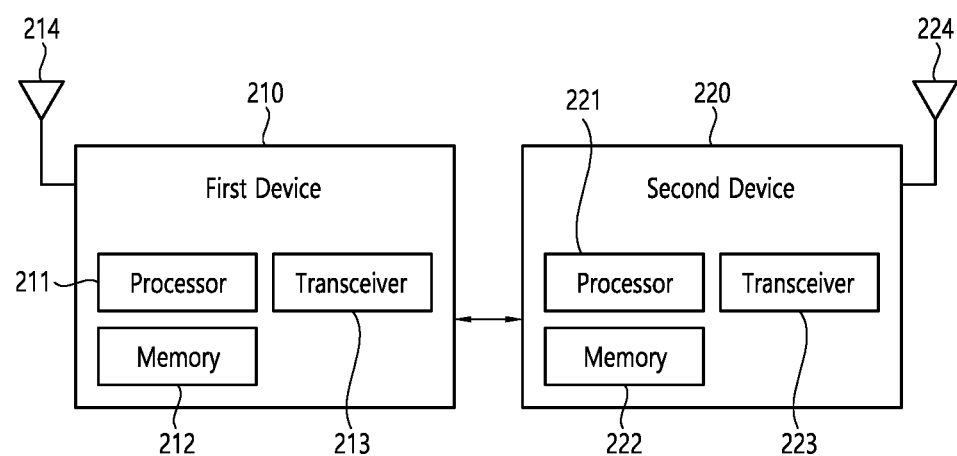
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
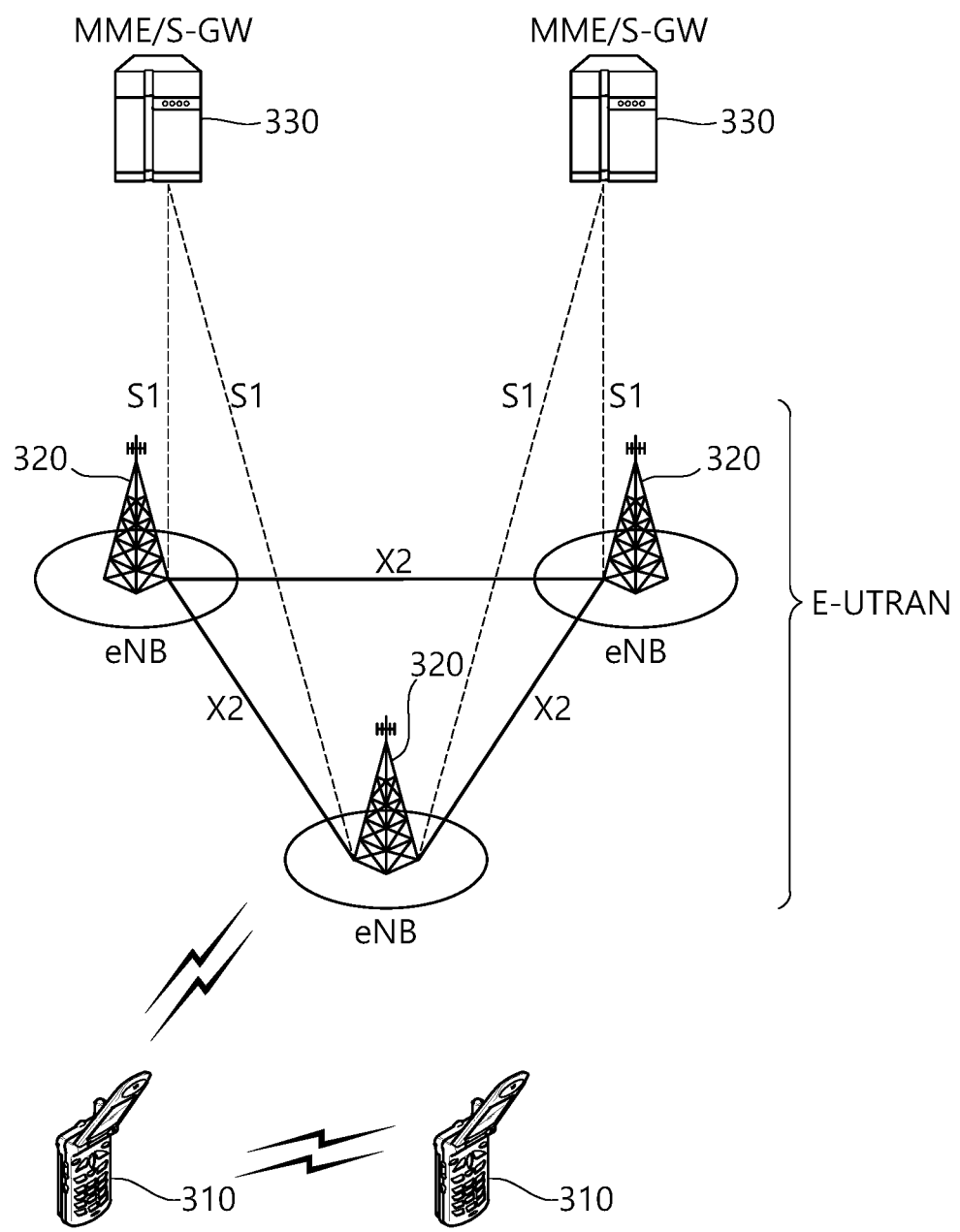
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
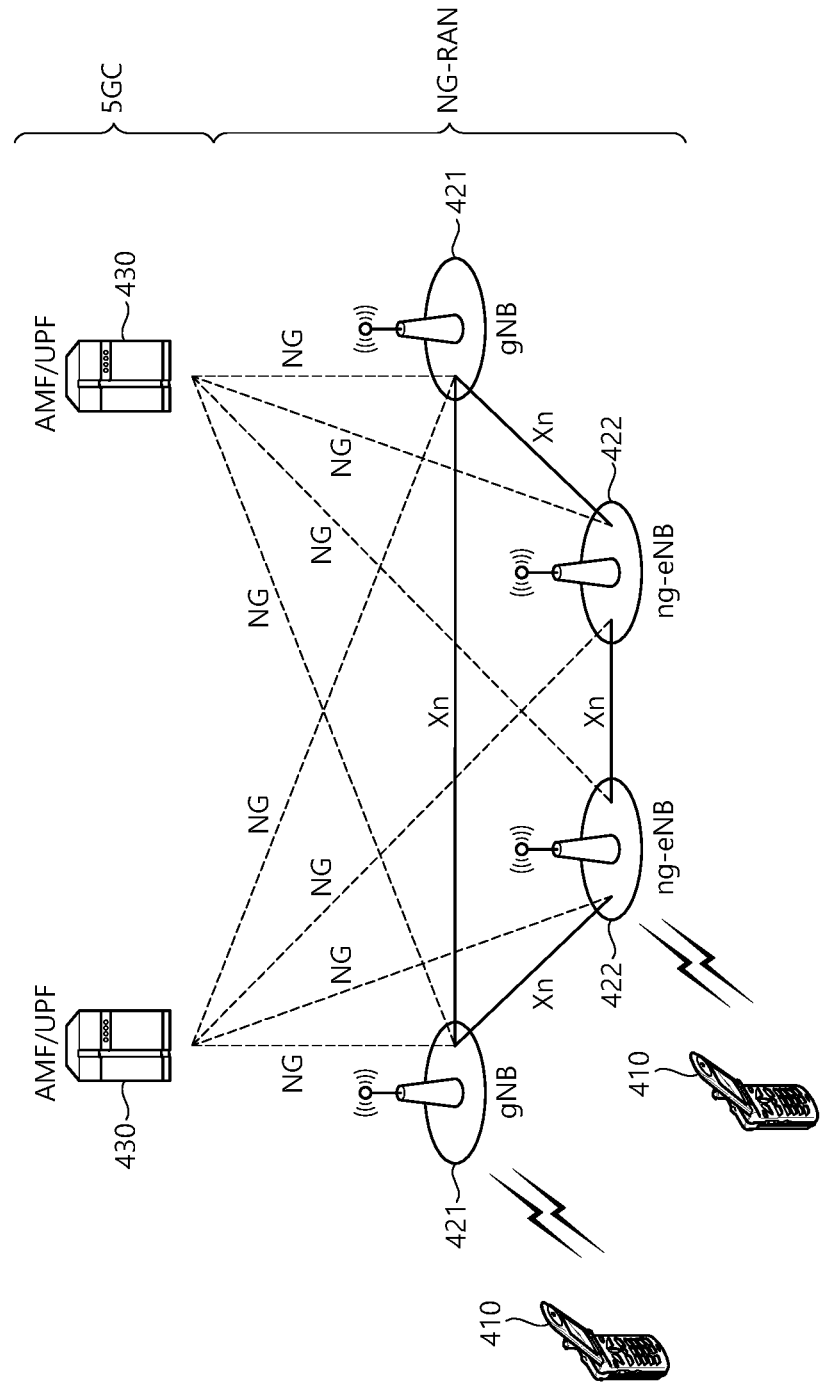
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 5:
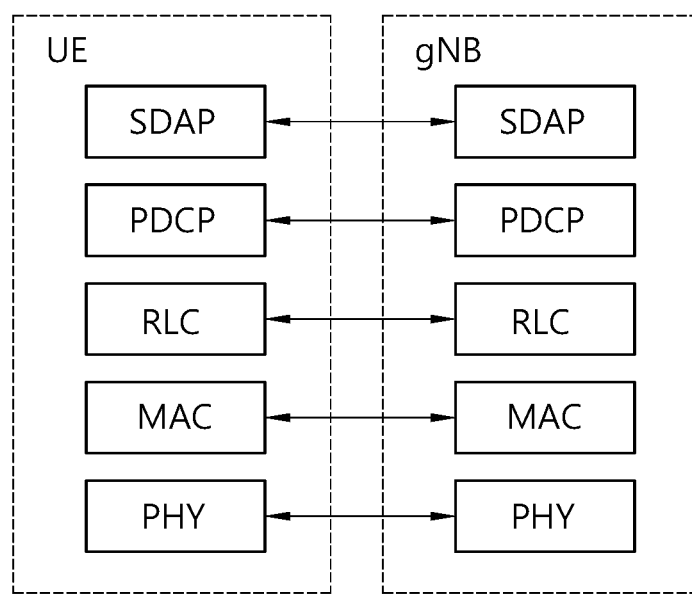
FIG. 5 shows a block diagram of a user plane protocol stack to which the technical features of the present disclosure can be applied.
Figure 6:
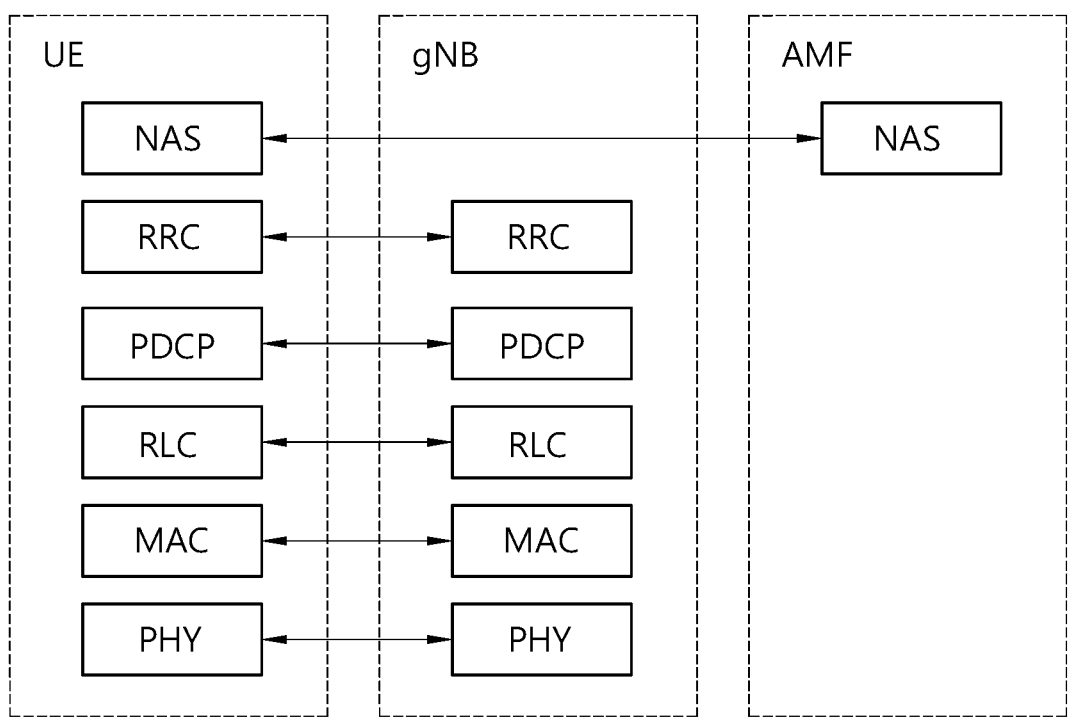
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARM), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Figure 7:
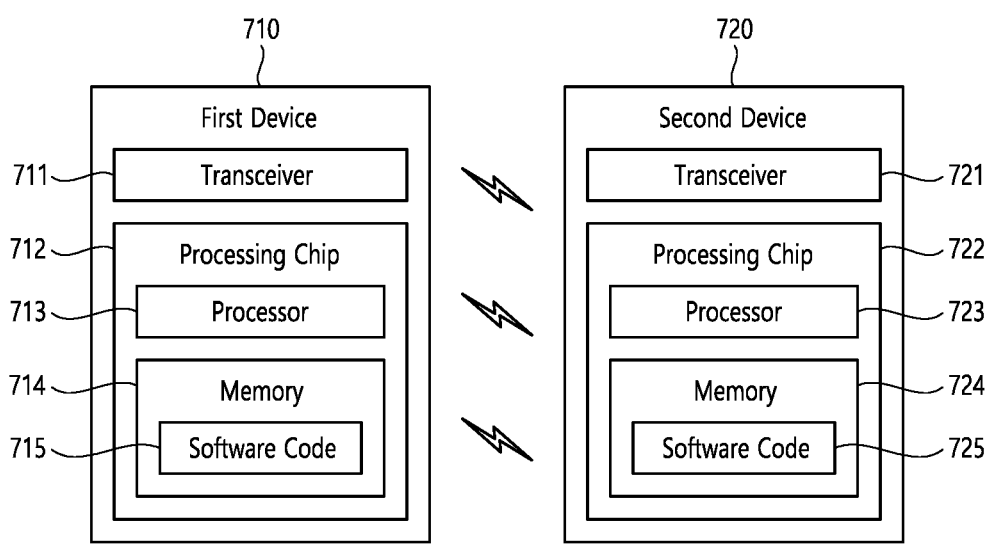
FIG. 7 shows another example of a wireless communication system to which the technical features of the present disclosure can be applied.

FIG. 7 shows another example of a wireless communication system to which the technical features of the present disclosure can be applied.

Referring to FIG. 7, wireless devices 710 and 720 may correspond to the wireless devices 210 and 220 of FIG. 2 and may be configured by various elements, components, units/portions, and/or modules.

The first wireless device 710 may include at least one transceiver, such as a transceiver 711, and at least one processing chip, such as a processing chip 712. The processing chip 712 may include at least one processor, such a processor 713, and at least one memory, such as a memory 714. The memory 714 may be operably connectable to the processor 713. The memory 714 may store various types of information and/or instructions. The memory 714 may store a software code 715 which implements instructions that, when executed by the processor 713, perform the descriptions, functions, procedures, suggestions, methods and/or operational flowcharts disclosed in the present disclosure. For example, the software code 715 may implement instructions that, when executed by the processor 713, perform the descriptions, functions, procedures, suggestions, methods and/or operational flowcharts disclosed in the present disclosure. For example, the software code 715 may control the processor 713 to perform one or more protocols. For example, the software code 715 may control the processor 713 may perform one or more layers of the radio interface protocol.

The second wireless device 720 may include at least one transceiver, such as a transceiver 721, and at least one processing chip, such as a processing chip 722. The processing chip 722 may include at least one processor, such a processor 723, and at least one memory, such as a memory 724. The memory 724 may be operably connectable to the processor 723. The memory 724 may store various types of information and/or instructions. The memory 724 may store a software code 725 which implements instructions that, when executed by the processor 723, perform the descriptions, functions, procedures, suggestions, methods and/or operational flowcharts disclosed in the present disclosure. For example, the software code 725 may implement instructions that, when executed by the processor 723, perform the descriptions, functions, procedures, suggestions, methods and/or operational flowcharts disclosed in the present disclosure. For example, the software code 725 may control the processor 723 to perform one or more protocols. For example, the software code 725 may control the processor 723 may perform one or more layers of the radio interface protocol.

Figure 8:
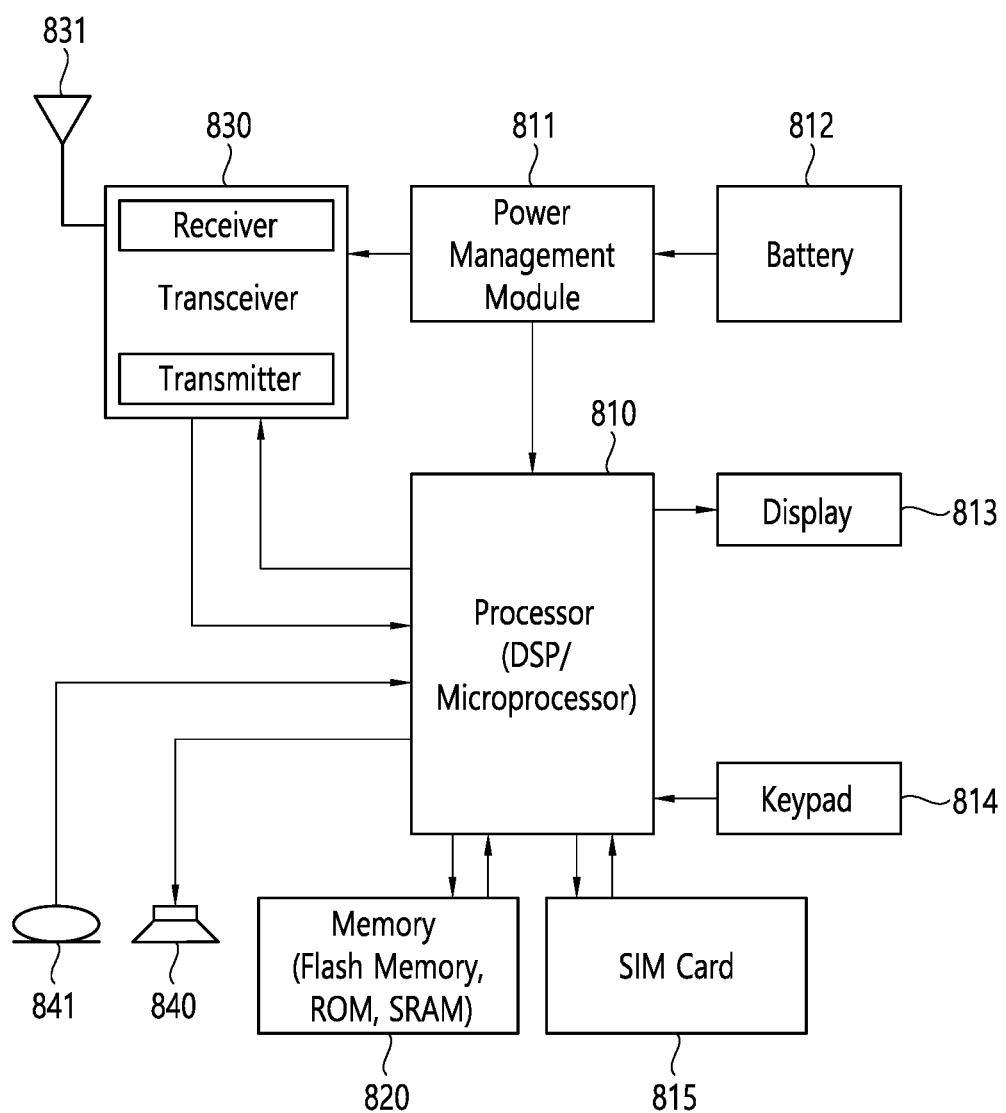
FIG. 8 shows a UE to which the technical features of the present disclosure can be applied.

FIG. 8 shows a UE to which the technical features of the present disclosure can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement the descriptions, functions, procedures, suggestions, methods and/or operational flowcharts disclosed in the present disclosure. The processor 810 may be configured to control one or more other components of the UE to implement the descriptions, functions, procedures, suggestions, methods and/or operational flowcharts disclosed in the present disclosure. Layers of the radio interface protocol may be implemented in the processor 810. The processor 810 may include ASIC, other chipset, logic circuit and/or data processing device. The processor 810 may be an application processor. The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

In 5G NR, use cases and benefits of RAN-centric data collection and utilization is being studied. Based on these use cases, relevant measurements and the procedure for configuration and collection of these measurements may be considered. Also, UE power saving study with focus in RRC_CONNECTED mode is in progress. Objective of UE power saving may include the followings.

a) Study UE Adaptation to the Traffic and UE Power Consumption Characteristics in Frequency, Time, Antenna Domains, Discontinuous Reception (DRX) Configuration, and UE Processing Timeline for UE Power Saving
  i) Network and/or UE assistance information
  ii) Include mechanism in reducing PDCCH monitoring, taking into account current DRX scheme
b) Study the Power Saving Signal/Channel/Procedure for Triggering Adaptation of UE Power Consumption Characteristics In order to support power saving of UE in RRC_CONNECTED mode, the RAN node may collect UE power saving related information and assist energy efficient operation for the UE based on collected UE power saving related information. However, when the RAN node which serves the UE is changed (e.g., handover), the energy efficient operation for the UE may not be performed and/or may take time to be able to be performed.

Since the UE has the mobility, although the RAN node which serves the UE is changed, the energy efficient operation for the UE should be supported. If not, power saving efficiency of UE in RRC_CONNECTED mode can be low because the changed RAN node may not collect UE power saving related information and/or take time to collect UE power saving related information. Accordingly, the changed RAN node may not be able to assist energy efficient operation for the UE.

Therefore, a method for assisting energy efficient operation for the UE when serving RAN node is changed due to UE mobility may be addressed and/or needed.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
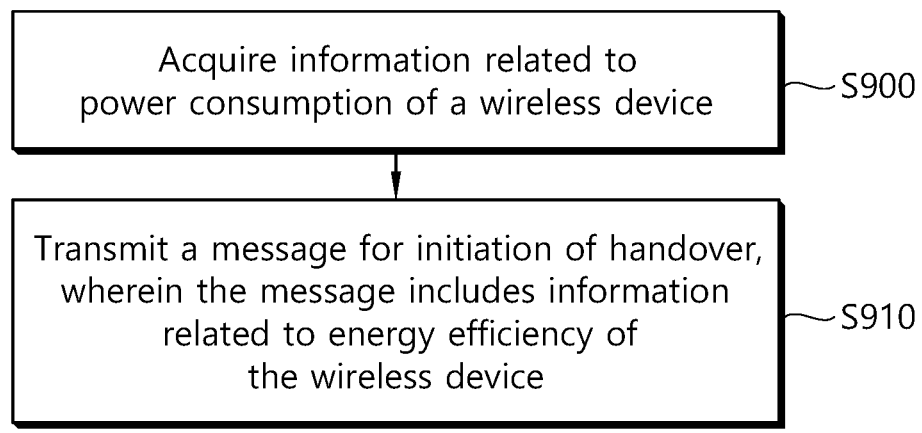
FIG. 9 shows an example of a method for a source node to which the technical features of the present disclosure can be applied.

FIG. 9 shows an example of a method for a source node to which the technical features of the present disclosure can be applied.

In step S900, the source node acquires information related to power consumption of a wireless device.

In some implementations, the information related to power consumption of the wireless device may be received from the wireless device.

In some implementations, the information related to power consumption may include information on how much battery of the wireless device has been used in cells served by the source node.

In some implementations, the information related to power consumption may include power consumption value for a power state of the wireless device. The power state of the wireless device will be described in detail later.

In step S910, the source node transmits a message for initiation of handover. The message includes information related to energy efficiency of the wireless device.

In some implementations, the information related to energy efficiency may be based on the information related to power consumption of the wireless device.

In some implementations, the message may be a handover request message transmitted to a target node, e.g., in case of Xn handover.

In some implementations, the message may be a handover required message transmitted to an AMF, e.g., in case of NG handover.

In some implementations, the information related to energy efficiency may include at least one of a link configuration, a scheduling record and/or throughput/data volume information for the wireless device. The information related to energy efficiency may include a representative value and/or a filtered value of each of the at least one of the link configuration, the scheduling record and/or the throughput/data volume information for the wireless device.

In some implementations, the information related to energy efficiency may include an estimated power consumption value based on at least one of a link configuration, a scheduling record and/or throughput/data volume information for the wireless device.

In some implementations, the information related to energy efficiency may include a time duration during which the wireless device stays in each power state.

In some implementations, the wireless device may be in communication with at least one of a mobile device, a network, and/or autonomous vehicles other than the wireless device.

In some implementations, the target node may transmit a handover request acknowledge message including information on resources allocated by the resource allocation, to e.g., source node and/or AMF.

In some implementations, the target node may receive a RRC reconfiguration complete message from the wireless device.

Figure 11:
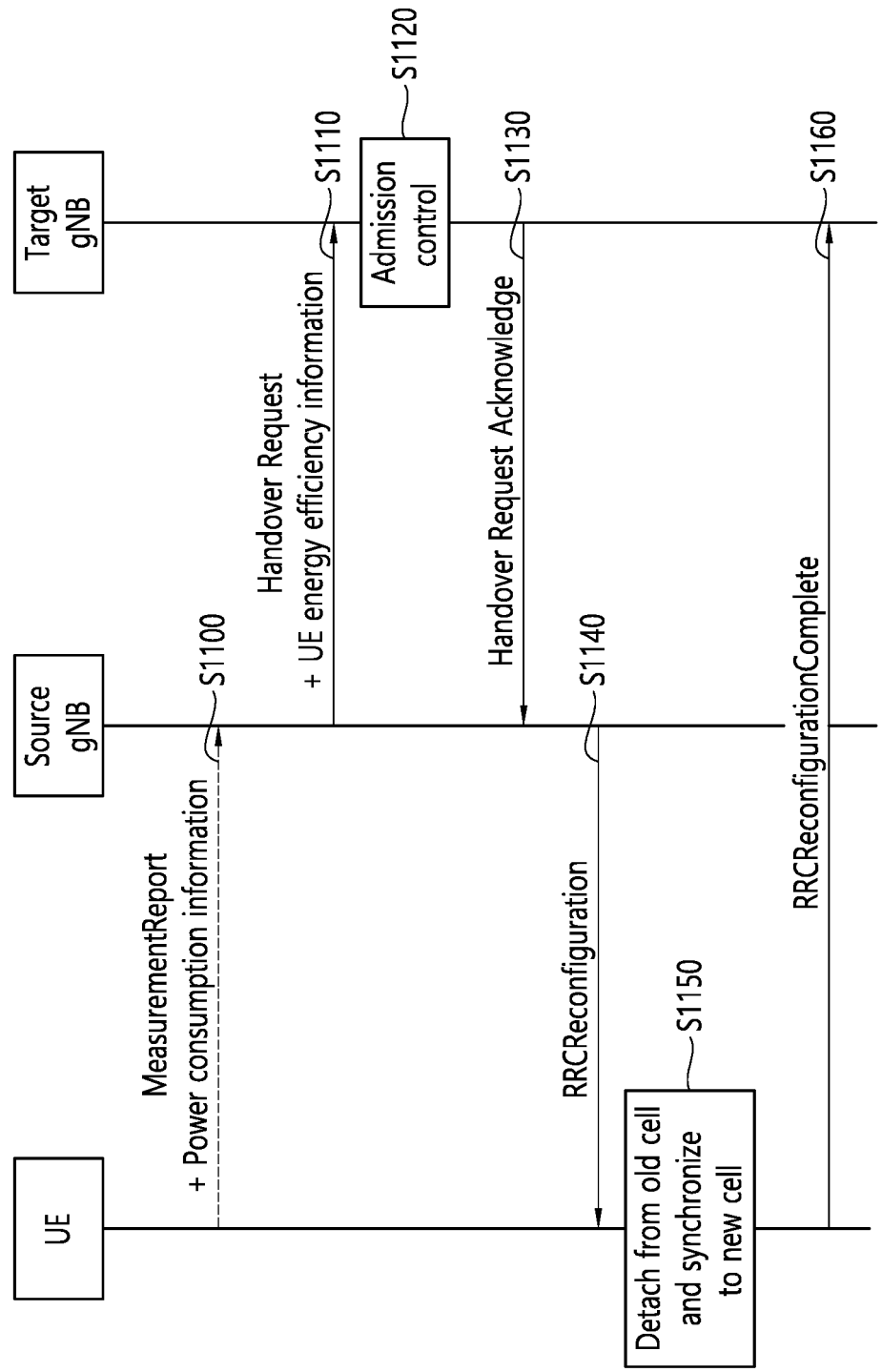
FIG. 11 shows an example of inter-gNB Xn based handover to which the technical features of the present disclosure can be applied.

FIG. 11 shows an example of inter-gNB Xn based handover to which the technical features of the present disclosure can be applied.

According to implementations disclosed in FIG. 11, the source gNB may provide the target gNB with information related to energy efficiency for the UE during Xn based handover. Therefore, the target gNB can assist energy efficient operation of the UE, e.g., resource allocation considering energy efficiency for the UE. According to implementations disclosed in FIG. 11, the UE may send to the source gNB information related to power which the UE consumes and/or has consumed in the coverage of source gNB.

In step S1100, the UE may send power consumption information of the UE to the source gNB.

In some implementations, the power consumption information of the UE may indicate how much battery is used and/or has been used in one of source gNB's cells.

In some implementations, the power consumption information of the UE may include power consumption value(s) for the defined UE's power state(s). Table 3 shows relationship between defined UE's power state(s) and relative power consumption value.

TABLE 3

| Power State | Characteristics | Relative Power |
| --- | --- | --- |
| Deep Sleep | Time interval for the sleep should be larger than the total transition time entering and leaving this state. Accurate timing may not be maintained. | 1 (Optional: 0.5) |
| Light Sleep | Time interval for the sleep should be larger than the total transition time entering and leaving this state. | 20 |
| Micro sleep | Immediate transition is assumed for power saving study purpose from or to a non-sleep state | 45 |
| PDCCH-only | No PDSCH and same-slot scheduling; this includes time for PDCCH decoding and any micro-sleep within the slot. | 100 |
| SSB or CSI-RS proc. | SSB can be used for fine time-frequency sync, and RSRP measurement of the serving/camping cell. TRS is the considered CSI-RS for sync. FFS the power scaling for processing other configurations of CSI-RS. | 100 |
| PDCCH + PDSCH | PDCCH + PDSCH. ACK/NACK in long PUCCH is modeled by UL power state. | 300 |
| UL | Long PUCCH or PUSCH. | 250 (0 dBm)<br>700 (23 dBm) |

Figure 10:
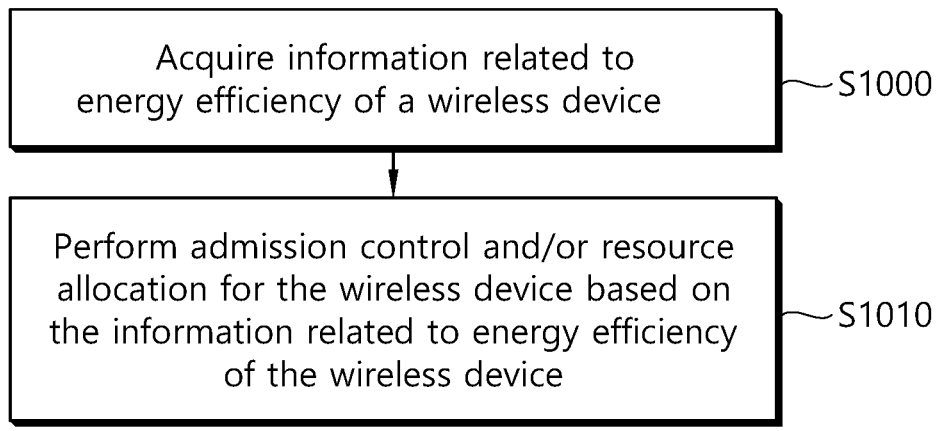
FIG. 10 shows an example of a method for a target node to which the technical features of the present disclosure can be applied.

FIG. 10 shows an example of a method for a target node to which the technical features of the present disclosure can be applied.

In step S1000, the target node acquires information related to energy efficiency of a wireless device.

In some implementations, the information related to energy efficiency may be acquired from a source node via a handover request message, e.g., in case of Xn handover.

In some implementations, the information related to energy efficiency may be acquired from an AMF via a handover request message, e.g., in case of NG handover.

In step S1010, the target node performs admission control and/or resource allocation for the wireless device based on the information related to energy efficiency of the wireless device.

In some implementations, the power consumption information may be transmitted to the source gNB via the RRC dedicated signaling, e.g., existing message such as MeasurementReport, UEInformationResponse, or UEAssistanceInformation, and/or a new message.

In step S1110, the source gNB initiates handover and issues a Handover Request message to the target gNB over the Xn interface. The Handover Request message includes UE energy efficiency information.

In some implementations, the UE energy efficiency information may be based on the power consumption information of the UE, which may be received from the UE in step S1100.

In some implementations, the UE energy efficiency information may be included into the existing information element (IE), e.g. UE History Information IE.

In some implementations, the UE energy efficiency information may contain at least one of a link configuration, a scheduling record and/or throughput/data volume information for the UE. In order to reduce the amount of the UE energy efficiency information to be transmitted to the target gNB, representative/filtered value for each of at least one of the link configuration, the scheduling record and/or the throughput/data volume information for the UE may be transmitted to the target gNB as the UE energy efficiency information. Or, an estimated power consumption value(s) based on at least one of the link configuration, the scheduling record and/or the throughput/data volume information for the UE may be transmitted to the target gNB as the UE energy efficiency information.

In some implementations, the UE energy efficiency information may include a time duration during which the UE stays in each power state shown in Table 3 above.

In step S1120, upon reception of the UE energy efficiency information, the target gNB may collect the UE energy efficiency information during which the UE stays in one of its cells and store the UE energy efficiency information to be used for future handover preparations. Also, based on the UE energy efficiency information, target gNB performs resource allocation considering energy efficiency of the UE. Also, the target gNB performs admission control based on the UE energy efficiency information.

In step S1130, the target gNB provides the RRC configuration as part of the Handover Request Acknowledge message to the source gNB. The RRC configuration may include information on resources allocated by the resource allocation considering energy efficiency of the UE.

In step S1140, the source gNB triggers the Uu handover by sending an RRCReconfiguration message to the UE.

In step S1150, the UE detaches from old cell, e.g., source cell, and synchronizes to new cell, e.g., the target cell.

In step S1160, the UE performs the RRC handover procedure by sending RRCReconfigurationComplete message to the target gNB.

According to implementations disclosed in FIG. 11, the target gNB can know the energy efficiency information for UE which is to be handed over. Based on the energy efficiency information for UE, the target gNB is able to assist energy efficient operation of the UE (e.g., resource allocation considering energy efficiency for the UE). UE's experience can be enhanced by maximizing UE battery lifetime.

Figure 12:
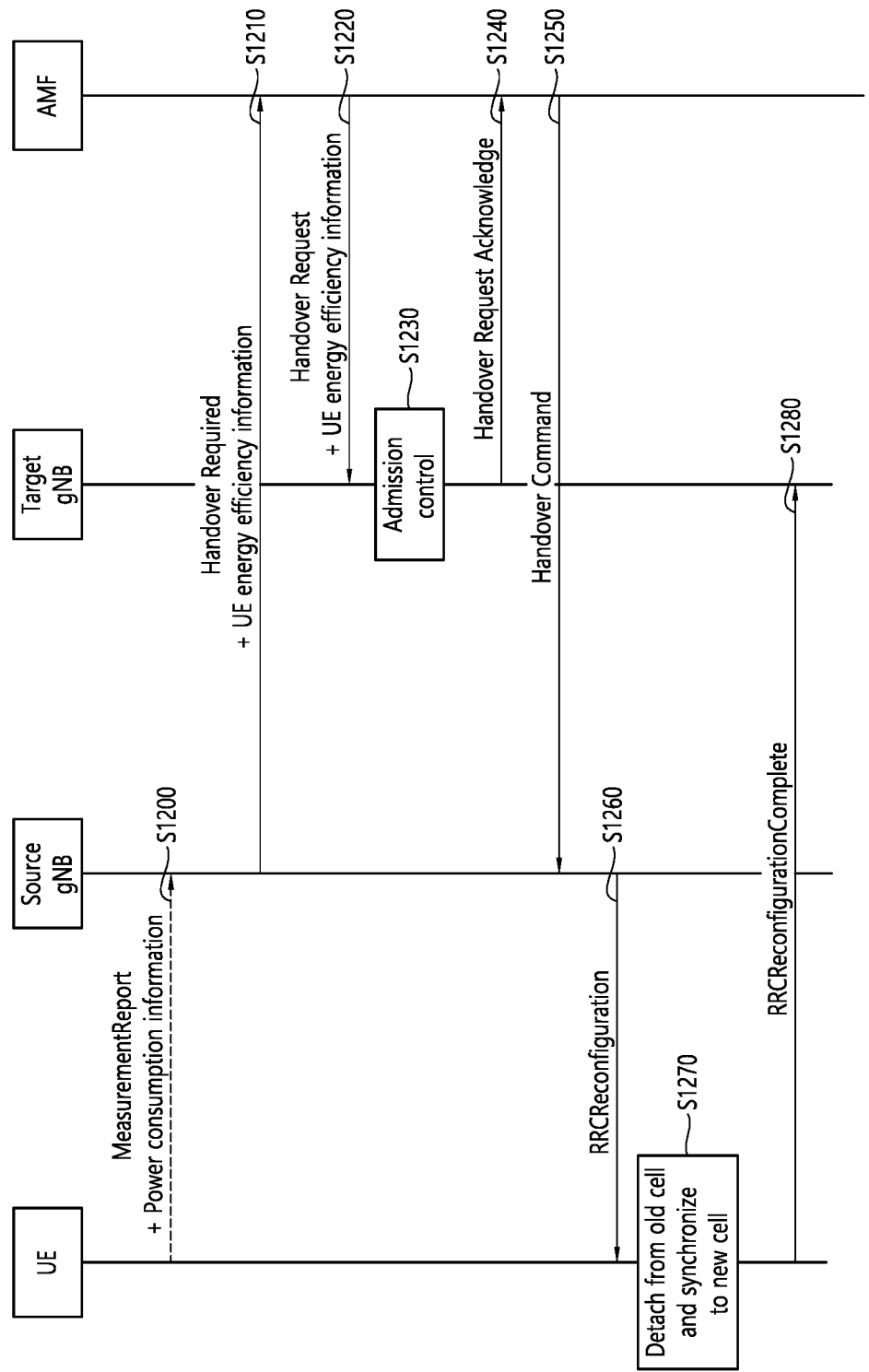
FIG. 12 shows an example of inter-gNB NG based handover to which the technical features of the present disclosure can be applied.

FIG. 12 shows an example of inter-gNB NG based handover to which the technical features of the present disclosure can be applied.

According to implementations disclosed in FIG. 12, the source gNB may provide the target gNB with information related to energy efficiency for the UE via AMF during NG based handover. Therefore, the target gNB can assist energy efficient operation of the UE, e.g., resource allocation considering energy efficiency for the UE. According to implementations disclosed in FIG. 12, the UE may send to the source gNB information related to power which the UE consumes and/or has consumed in the coverage of source gNB.

In step S1200, the UE may send power consumption information of the UE to the source gNB.

In some implementations, the power consumption information of the UE may indicate how much battery is used and/or has been used in one of source gNB's cells.

In some implementations, the power consumption information of the UE may include power consumption value(s) for the defined UE's power state(s). Relationship between defined UE's power state(s) and relative power consumption value is shown in Table 3 above.

In some implementations, the power consumption information may be transmitted to the source gNB via the RRC dedicated signaling, e.g., existing message such as MeasurementReport, UEInformationResponse, or UEAssistanceInformation, and/or a new message.

In step S1210, the source gNB initiates handover and issues a Handover Required message to the AMF over the NG interface. The Handover Required message includes UE energy efficiency information.

In some implementations, the UE energy efficiency information may be based on the power consumption information of the UE, which may be received from the UE in step S1200.

In some implementations, the UE energy efficiency information may be included into the Source NG-RAN Node to Target NG-RAN Node Transparent Container IE in the Handover Required message. The UE energy efficiency information may be included into the existing IE, e.g. UE History Information IE.

In some implementations, the UE energy efficiency information may contain at least one of a link configuration, a scheduling record and/or throughput/data volume information for the UE. In order to reduce the amount of the UE energy efficiency information to be transmitted to the target gNB, representative/filtered value for each of at least one of the link configuration, the scheduling record and/or the throughput/data volume information for the UE may be transmitted to the target gNB as the UE energy efficiency information. Or, an estimated power consumption value(s) based on at least one of the link configuration, the scheduling record and/or the throughput/data volume information for the UE may be transmitted to the target gNB as the UE energy efficiency information.

In some implementations, the UE energy efficiency information may include a time duration during which the UE stays in each power state shown in Table 3 above.

In step S1220, the AMF transmits to the target gNB the Handover Request message. The Handover Request message includes the UE energy efficiency information which is received from source gNB and included into the Source NG-RAN Node to Target NG-RAN Node Transparent Container IE.

In step S1230, upon reception of the UE energy efficiency information, the target gNB may collect the UE energy efficiency information during which the UE stays in one of its cells and store the UE energy efficiency information to be used for future handover preparations. Also, based on the UE energy efficiency information, target gNB performs resource allocation considering energy efficiency of the UE. Also, the target gNB performs admission control based on the UE energy efficiency information.

In step S1240, the target gNB responds with the Handover Request Acknowledge message to the AMF. The Handover Request Acknowledge message may include information on resources allocated by the resource allocation considering energy efficiency of the UE.

In step S1250, when the preparation including the reservation of resource at the target gNB is ready, the AMF responds with the Handover Command message to the source gNB. The Handover Command message may include information on resources allocated by the resource allocation considering energy efficiency of the UE.

In step S1260, the source gNB triggers the Uu handover by sending an RRCReconfiguration message to the UE.

In step S1270, the UE detaches from old cell, e.g., source cell, and synchronizes to new cell, e.g., the target cell.

In step S1280, the UE performs the RRC handover procedure by sending RRCReconfigurationComplete message to the target gNB.

According to implementations disclosed in FIG. 12, the target gNB can know the energy efficiency information for UE which is to be handed over. Based on the energy efficiency information for UE, the target gNB is able to assist energy efficient operation of the UE (e.g., resource allocation considering energy efficiency for the UE). UE's experience can be enhanced by maximizing UE battery lifetime.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 13:
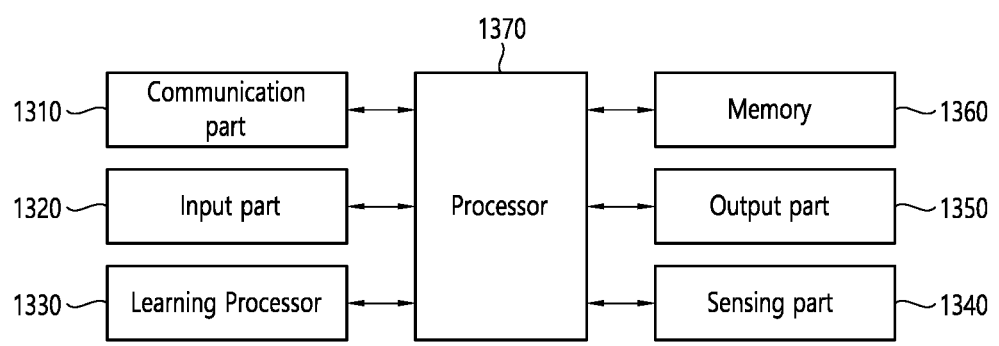
FIG. 13 shows an example of an AI device to which the technical features of the present disclosure can be applied.

FIG. 13 shows an example of an AI device to which the technical features of the present disclosure can be applied.

The AI device 1300 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 13, the AI device 1300 may include a communication part 1310, an input part 1320, a learning processor 1330, a sensing part 1340, an output part 1350, a memory 1360, and a processor 1370.

The communication part 1310 can transmit and/or receive data to and/or from external devices such as the AI devices and the AI server using wire and/or wireless communication technology. For example, the communication part 1310 can transmit and/or receive sensor information, a user input, a learning model, and a control signal with external devices. The communication technology used by the communication part 1310 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1320 can acquire various kinds of data. The input part 1320 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1320 can acquire input data to be used when acquiring an output using learning data and a learning model for model learning. The input part 1320 may obtain raw input data, in which case the processor 1370 or the learning processor 1330 may extract input features by preprocessing the input data.

The learning processor 1330 may learn a model composed of an ANN using learning data. The learned ANN can be referred to as a learning model. The learning model can be used to infer result values for new input data rather than learning data, and the inferred values can be used as a basis for determining which actions to perform. The learning processor 1330 may perform AI processing together with the learning processor of the AI server. The learning processor 1330 may include a memory integrated and/or implemented in the AI device 1300. Alternatively, the learning processor 1330 may be implemented using the memory 1360, an external memory directly coupled to the AI device 1300, and/or a memory maintained in an external device.

The sensing part 1340 may acquire at least one of internal information of the AI device 1300, environment information of the AI device 1300, and/or the user information using various sensors. The sensors included in the sensing part 1340 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1350 may generate an output related to visual, auditory, tactile, etc. The output part 1350 may include a display unit for outputting visual information, a speaker for outputting auditory information, and/or a haptic module for outputting tactile information.

The memory 1360 may store data that supports various functions of the AI device 1300. For example, the memory 1360 may store input data acquired by the input part 1320, learning data, a learning model, a learning history, etc.

The processor 1370 may determine at least one executable operation of the AI device 1300 based on information determined and/or generated using a data analysis algorithm and/or a machine learning algorithm. The processor 1370 may then control the components of the AI device 1300 to perform the determined operation. The processor 1370 may request, retrieve, receive, and/or utilize data in the learning processor 1330 and/or the memory 1360, and may control the components of the AI device 1300 to execute the predicted operation and/or the operation determined to be desirable among the at least one executable operation. The processor 1370 may generate a control signal for controlling the external device, and may transmit the generated control signal to the external device, when the external device needs to be linked to perform the determined operation. The processor 1370 may obtain the intention information for the user input and determine the user's requirements based on the obtained intention information. The processor 1370 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1330 and/or learned by the learning processor of the AI server, and/or learned by their distributed processing. The processor 1370 may collect history information including the operation contents of the AI device 1300 and/or the user's feedback on the operation, etc. The processor 1370 may store the collected history information in the memory 1360 and/or the learning processor 1330, and/or transmit to an external device such as the AI server. The collected history information can be used to update the learning model. The processor 1370 may control at least some of the components of AI device 1300 to drive an application program stored in memory 1360. Furthermore, the processor 1370 may operate two or more of the components included in the AI device 1300 in combination with each other for driving the application program.

Figure 14:
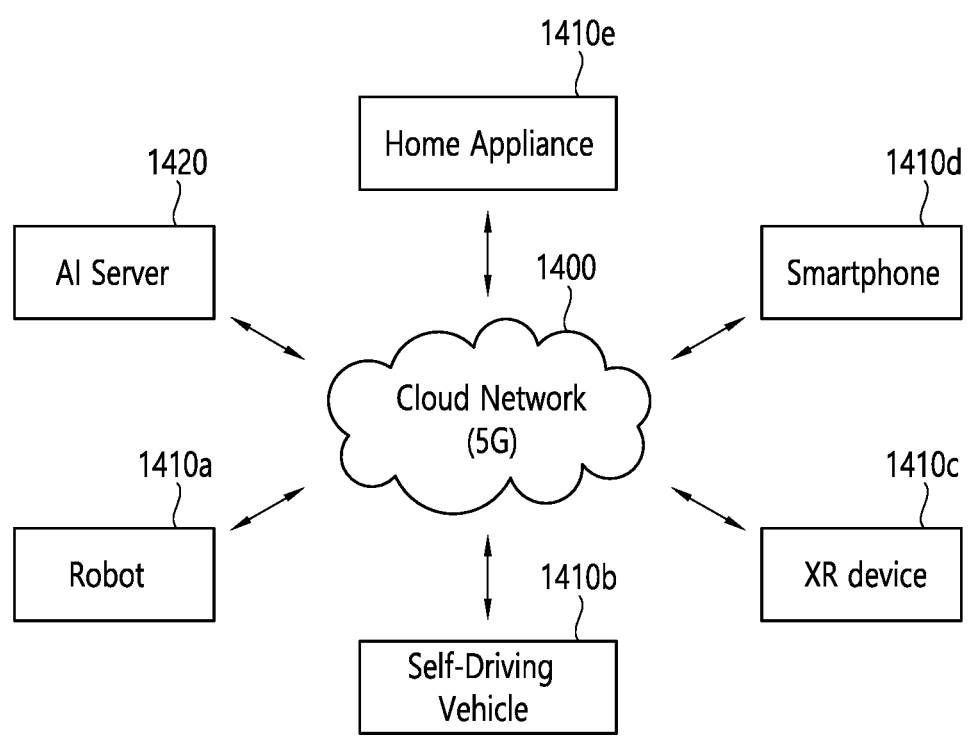
FIG. 14 shows an example of an AI system to which the technical features of the present disclosure can be applied.

FIG. 14 shows an example of an AI system to which the technical features of the present disclosure can be applied.

Referring to FIG. 14, in the AI system, at least one of an AI server 1420, a robot 1410a, an autonomous vehicle 1410b, an XR device 1410c, a smartphone 1410d and/or a home appliance 1410e is connected to a cloud network 1400. The robot 1410a, the autonomous vehicle 1410b, the XR device 1410c, the smartphone 1410d, and/or the home appliance 1410e to which the AI technology is applied may be referred to as AI devices 1410a to 1410e.

The cloud network 1400 may refer to a network that forms part of a cloud computing infrastructure and/or resides in a cloud computing infrastructure. The cloud network 1400 may be configured using a 3G network, a 4G or LTE network, and/or a 5G network. That is, each of the devices 1410a to 1410e and 1420 consisting the AI system may be connected to each other through the cloud network 1400. In particular, each of the devices 1410a to 1410e and 1420 may communicate with each other through a base station, but may directly communicate with each other without using a base station.

The AI server 1420 may include a server for performing AI processing and a server for performing operations on big data. The AI server 1420 is connected to at least one or more of AI devices constituting the AI system, i.e., the robot 1410a, the autonomous vehicle 1410b, the XR device 1410c, the smartphone 1410d and/or the home appliance 1410e through the cloud network 1400, and may assist at least some AI processing of the connected AI devices 1410a to 1410e. The AI server 1420 can learn the ANN according to the machine learning algorithm on behalf of the AI devices 1410a to 1410e, and can directly store the learning models and/or transmit them to the AI devices 1410a to 1410e. The AI server 1420 may receive the input data from the AI devices 1410a to 1410e, infer the result value with respect to the received input data using the learning model, generate a response and/or a control command based on the inferred result value, and transmit the generated data to the AI devices 1410a to 1410e. Alternatively, the AI devices 1410a to 1410e may directly infer a result value for the input data using a learning model, and generate a response and/or a control command based on the inferred result value.

Various embodiments of the AI devices 1410a to 1410e to which the technical features of the present disclosure can be applied will be described. The AI devices 1410a to 1410e shown in FIG. 14 can be seen as specific embodiments of the AI device 1300 shown in FIG. 13.

The present disclosure can have various advantageous effects.

For example, the target gNB can know the energy efficiency information for UE which is to be handed over.

For example, based on the energy efficiency information for UE, the target gNB can assist energy efficient operation of the UE (e.g., resource allocation considering energy efficiency for the UE).

For example, UE's experience can be enhanced by maximizing UE battery lifetime.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a source node adapted to operate in a wireless communication system, the method comprising:
    acquiring information related to power consumption of a wireless device;
    transmitting a first message for initiation of handover;
    receiving a second message in response to the first message; and
    triggering the handover by transmitting a radio resource control (RRC) reconfiguration message to the wireless device, wherein the first message includes information related to energy efficiency of the wireless device, wherein the information related to the energy efficiency of the wireless device is based on the information related to the power consumption of the wireless device, and wherein the information related to the energy efficiency of the wireless device includes an estimated power consumption value based on at least one of a link configuration, a scheduling record and/or throughput/data volume information for the wireless device.

2. The method of claim 1, wherein the first message is a handover request message transmitted to a target node.

3. The method of claim 1, wherein the first message is a handover required message transmitted to an access and mobility management function (AMF).

4. The method of claim 1, wherein the information related to the power consumption includes information on how much battery of the wireless device has been used in cells served by the source node.

5. The method of claim 1, wherein the information related to the power consumption includes power consumption value for a power state of the wireless device.

6. The method of claim 1, wherein the information related to the energy efficiency includes the at least one of the link configuration, the scheduling record and/or the throughput/data volume information for the wireless device.

7. The method of claim 6, wherein the information related to the energy efficiency includes a representative value and/or a filtered value of each of the at least one of the link configuration, the scheduling record and/or the throughput/data volume information for the wireless device.

8. The method of claim 1, wherein the information related to the energy efficiency includes a time duration during which the wireless device stays in each power state.

9. The method of claim 1, wherein the wireless device is in communication with at least one of a mobile device, a network, and/or autonomous vehicles other than the wireless device.

* * * * *